(12) United States Patent
Molstad et al.

(10) Patent No.: US 7,046,466 B1
(45) Date of Patent: May 16, 2006

(54) DUAL DENSITY RECORDING FOR DIRECTION-DEPENDENT LINEAR MEDIA

(75) Inventors: Richard W. Molstad, St. Paul, MN (US); Tim T. Ngo, Burnsville, MN (US); Takanori Sato, Miyagi (JP)

(73) Assignees: Imation Corp., Oakdale, MN (US); Sony Corporation, Tokyo (JP)

( * ) Notice: Subject to any disclaimer, the term of this patent is extended or adjusted under 35 U.S.C. 154(b) by 0 days.

(21) Appl. No.: 11/015,831

(22) Filed: Dec. 16, 2004

(51) Int. Cl.
*G11B 5/09* (2006.01)
*G11B 15/46* (2006.01)
*G11B 5/584* (2006.01)
*G11B 5/55* (2006.01)

(52) U.S. Cl. .................. 360/48; 360/73.06; 360/77.12; 360/78.02

(58) Field of Classification Search .................. None
See application file for complete search history.

(56) References Cited

U.S. PATENT DOCUMENTS

| | | | | |
|---|---|---|---|---|
| 4,819,092 A | * | 4/1989 | Richards | 360/27 |
| 5,754,356 A | * | 5/1998 | Honjo et al. | 360/73.12 |
| 6,154,332 A | * | 11/2000 | Yanagawa et al. | 360/64 |
| 6,349,010 B1 | * | 2/2002 | Binder-Krieglstein | 360/77.12 |

\* cited by examiner

*Primary Examiner*—Andrew L. Sniezek
(74) *Attorney, Agent, or Firm*—Eric D. Levinson

(57) ABSTRACT

The invention provides a linear data storage medium, such as magnetic tape, in which data tracks that extend in one direction are recorded at a different density than data tracks recorded in the opposite direction. Various techniques are also described to facilitate such dual density recording. The invention is particularly advantageous for direction-dependent linear data storage media, by allowing similar error rates to be achieved in both directions on the media.

21 Claims, 7 Drawing Sheets

DUAL DENSITY RECORDING FOR DIRECTION-DEPENDENT LINEAR MEDIA

TECHNICAL FIELD

The invention relates to linear data storage media such as magnetic tape and, more particularly, to techniques for recording on direction-dependent linear data storage media.

BACKGROUND

Linear data storage media refers to data storage media, such as magnetic tape, in which data is stored in parallel tracks that extend linearly along the length of the media. Examples of linear data storage media include magnetic tape, magneto-optic tape, optical tape, holographic tape, and possibly other tape-like media formats. Magnetic tape media remains an economical medium for storing large amounts of data. For example, magnetic tape cartridges or large spools of magnetic tape are often used to back up large amounts of data for large computing centers. Magnetic tape cartridges also find application in the backup of data stored on smaller computers such as workstations, desktop or laptop computers.

In magnetic tape, data is typically stored as magnetic signals that are magnetically recorded on the medium surface. The data stored on the magnetic tape is often organized along data tracks, and read/write heads are positioned relative to the data tracks to write data to the tracks or to read data from the tracks. As the number of data tracks increases, the data storage capacity of the magnetic tape likewise increases. However, as the number of data tracks increases, the tracks become narrower and more crowded on the surface of the data storage tape. Servo marks are also commonly defined on magnetic media to provide reference points for tracking the location of data tracks. Servo marks can improve the ability to locate data tracks, particularly as the data tracks become narrower and more crowded on the surface of the data storage tape. Servo marks may be recorded in special servo tracks, or interspersed in the data tracks.

Some linear data storage media are "direction-dependent." Direction-dependent linear media refers to media in which the ability to record data on the media varies based on the direction that the media is moving relative to the recording head. An example of direction-dependent media is metal-evaporated (ME) magnetic tape. In ME tape, the easy axis of magnetic recording domains does not lie in the plane of the tape, but is canted vertically from the plane of the tape. Due to this difference in magnetic geometry, the error rate in the two recording directions at a constant data recording density is typically very different.

SUMMARY

In general, the invention provides a linear data storage medium, such as magnetic tape, in which data tracks that extend in one direction are recorded at a different density than data tracks recorded in the opposite direction. Various techniques are also described to facilitate such dual density recording. The invention is particularly advantageous for direction-dependent linear data storage media, allowing similar error rates to be achieved in both directions on the media.

In one example, a dual density linear data storage medium can be recorded by varying the tape speed in the forward and reverse directions of the medium. In that case, the recording head may write data at a constant rate, but the different speeds result in different densities in forward and reverse data tracks. In another example, a dual density linear data storage medium can be recorded by varying the recording rate in the forward and reverse directions of the medium. In that case, the recording head may write data at different rates, but the tape speed may be the same for recording in the forward and reverse data tracks.

In one embodiment, the invention provides a linear data storage medium comprising a first data track and a second data track. The first data track extends along a length of the medium and is recorded with first data in a first direction along the length at a first density. The second data track extends along the length of the medium, and is recorded with second data in a second direction opposite the first direction at a second density. The first density is different from the second density.

In another embodiment, the invention provides a method of recording data on a linear data storage medium comprising recording first data in a first direction on a first data track of the medium at a first density, and recording second data in a second direction on a second data track of the medium at a second density, wherein the first direction is opposite the second direction.

In another embodiment, the invention provides a system comprising one or more recording heads and a linear data storage medium. The linear data storage medium includes a first data track extending along a length of the medium and a second data track extending along the length of the medium. The one or more recording heads record first data in a first direction at a first density in the first data track and record second data in a second direction opposite the first direction at a second density in the second data track.

The various embodiments of the invention may be capable of providing one or more advantages. Specifically, the invention can allow for forward and reverse data tracks in a direction-dependent linear medium to have similar error rates. Similar error rates for the forward and reverse data tracks, in turn, can improve the quality of the linear data storage media, particularly directional-dependent media for which error rates typically differ in the different recording directions. The integrity of stored data may also be improved, particularly in the reverse direction, which conventionally has higher error rates than the forward direction in directional-dependent media. Whereas conventional systems generally define a desired recording density for a forward direction and apply the same recording density for a reverse direction, the described invention can improve the recording accuracy of media by changing the recording density for the forward and reverse directions. In this manner, direction-dependent media such as metal evaporated (ME) magnetic tape can be improved.

The details of one or more embodiments of the invention are set forth in the accompanying drawings and the description below. Other features, objects, and advantages of the invention will be apparent from the description and drawings, and from the claims.

DETAILED DESCRIPTION

The invention provides a linear data storage medium, such as magnetic tape, in which data tracks that extend in one direction are recorded at a different density than data tracks recorded in the opposite direction. As described in greater detail below, the medium may define forward data tracks and reverse data tracks. These forward and reverse data tracks refer to the data tracks recorded during motion of the medium in the forward and reverse directions, respectively. The invention exploits a phenomenon exhibited by direction-dependent linear data storage media, such as metal evaporated (ME) tape in which the ability to record on the medium is affected by the recording direction. In particular, by adjusting the recording density in the forward and reverse directions, the invention can improve direction-dependent media by defining similar error rates in the forward and reverse directions.

Two different techniques are described for creating a linear medium having different recording densities in the forward and reverse data tracks. In one technique, a dual density linear data storage medium is recorded by varying the tape speed in the forward and reverse directions of the medium. In that case, the recording head may write data at a constant rate, but the different speeds result in different densities in forward and reverse data tracks. In another technique, a dual density linear data storage medium is recorded by varying the recording rate in the forward and reverse directions of the medium. In that case, the recording head may write data at different rates, but the tape speed may be the same for recording in the forward and reverse data tracks. A combination of these techniques in which the speed and the recording rate are varied in the forward and reverse directions can also be used. In any case, the resultant medium may have similar error rates in the forward and reverse directions, which is highly desirable.

Figure 1:
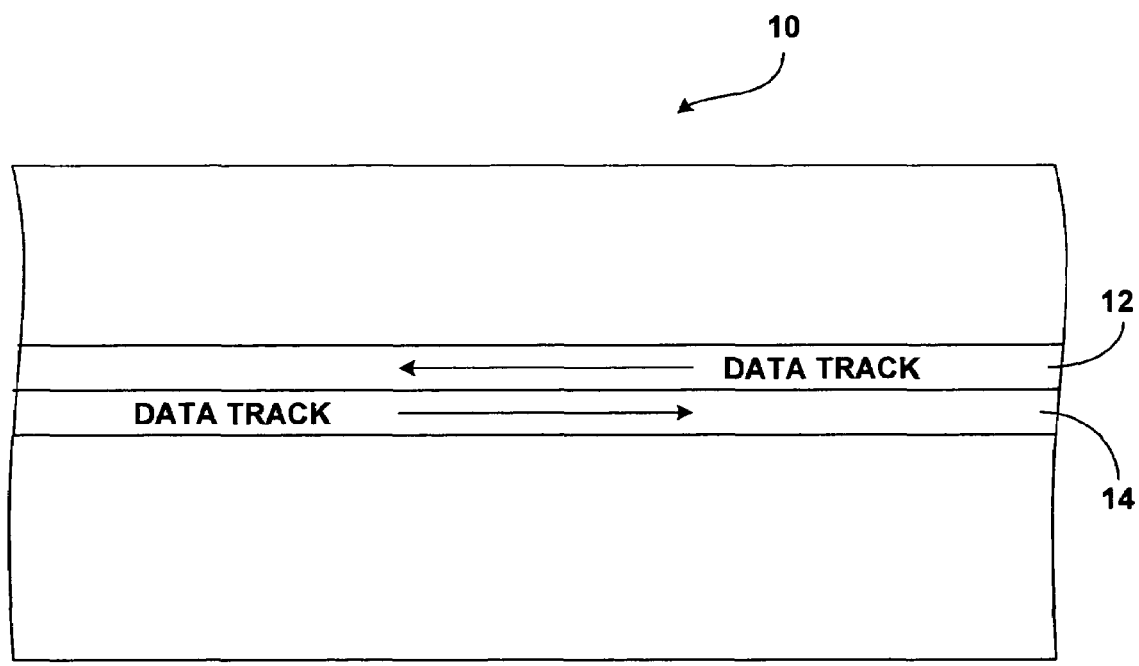
FIG. 1 is a conceptual view of a portion of a linear data storage medium having forward and reverse data tracks recorded at different densities in accordance with an embodiment of the invention.

FIG. 1 is conceptual view of a portion of a linear data storage medium 10 having forward and reverse data tracks recorded at different densities in accordance with an embodiment of the invention. In particular, linear data storage medium 10 comprises a first data track 12 extending along a length of medium 12 and a second data track 14 extending along the length of medium 10. As illustrated by the arrows, first data track 12 is recorded in a first direction along the length of medium 10, whereas second data track 12 is recorded in a second direction opposite the first direction along the length of medium 10. By way of example, the first direction associated with first track 12 may be referred to as the forward direction and the second direction associated with second track 14 may be referred to as the reverse direction, although these directions could be defined in the opposite manner.

Importantly, the first data recorded in first track 12 in the first direction is recorded at a different density than the second data recorded in second track 14 in the second direction. In other words, the first data recorded in first track 12 in the first direction is recorded at a first density, and the second data recorded in second track 14 in the second direction is recorded at a second density different from the first density. For directional-dependent magnetic media, such dual density recording can result in an error rate associated with the first data on first data track 12 being equal to an error rate associated with the second data on second data track 14. The density generally refers to the amount of data stored per unit area, or the amount of data per unit length for linear media that has a substantially constant width.

Linear data storage medium 10 may comprise magnetic tape having an easy axis of magnetic recording domains that does not lie in a plane of the tape but is canted vertically from the plane of the tape. One example of such magnetic tape is metal evaporated (ME) magnetic tape. The invention is not necessarily limited to such magnetic tape, however, and may find application in other types of linear tape, other types of magnetic media, or other types of directional-dependent media.

At least two different techniques may be used to record data in data tracks 12 and 14 at different densities. In one case, the first data on first data track 12 is written at a first rate when medium 10 travels in the first direction relative to a recording head (not shown in FIG. 1) at a tape speed, and the second data on second data track 14 is written at a second rate when medium 10 travels in the second direction relative to the recording head at the tape speed. The first rate may be different from the second rate. Accordingly, the recording rate may be modified in the forward and reverse directions, at constant tape speed in the different directions, in order to vary the recording density in the forward and reverse directions.

In another case, the first data on first data track 12 is written at a rate when medium 10 travels in the first direction relative to a recording head at a first speed, and the second data on second data track 14 is written at the rate when the medium travels in the second direction relative to the recording head at a second speed. In this case, the first tape speed may be different from the second tape speed. Accordingly, the tape speed may be modified in the forward and reverse directions, at constant recording rates in the different directions, in order to vary the recording density in the forward and reverse directions.

A combination of these techniques in which the speed and the recording rate are varied in the forward and reverse directions can also be used. In that case, the desired recording densities in the forward and reverse directions can be defined differently in the forward and reverse directions by adjusting tape speed and recording rate in the different directions.

Figure 2:
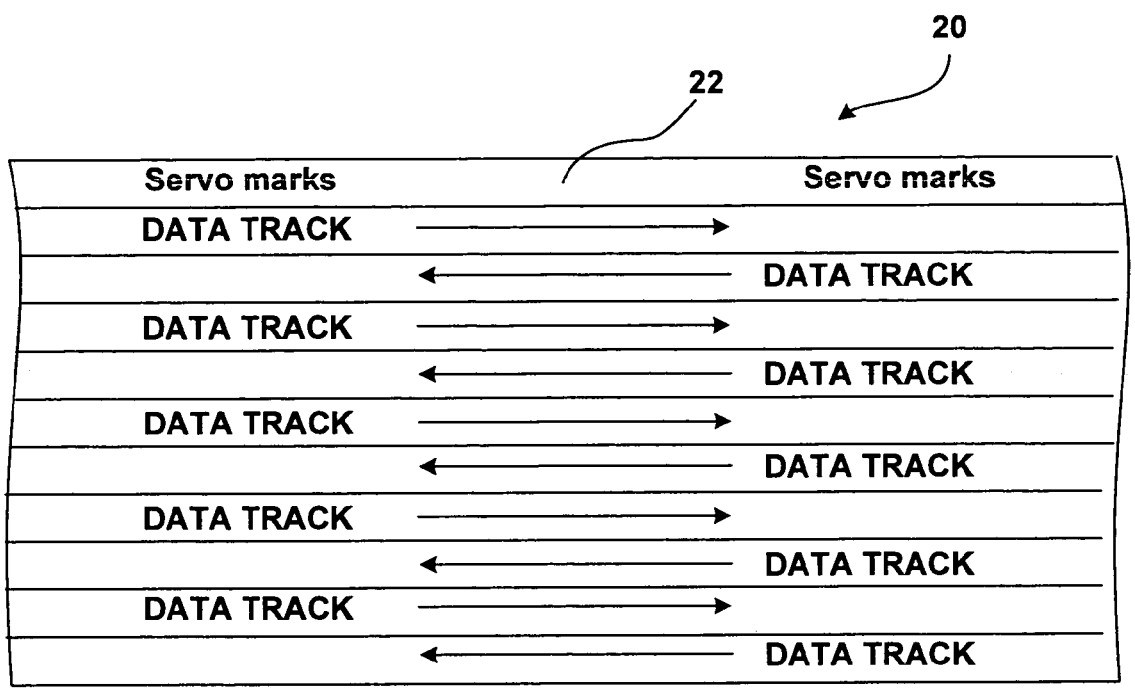
FIGS. 2 and 3 are conceptual views of portions of linear data storage media having a plurality of data tracks recorded at different densities in the forward and reverse directions.
Figure 3:
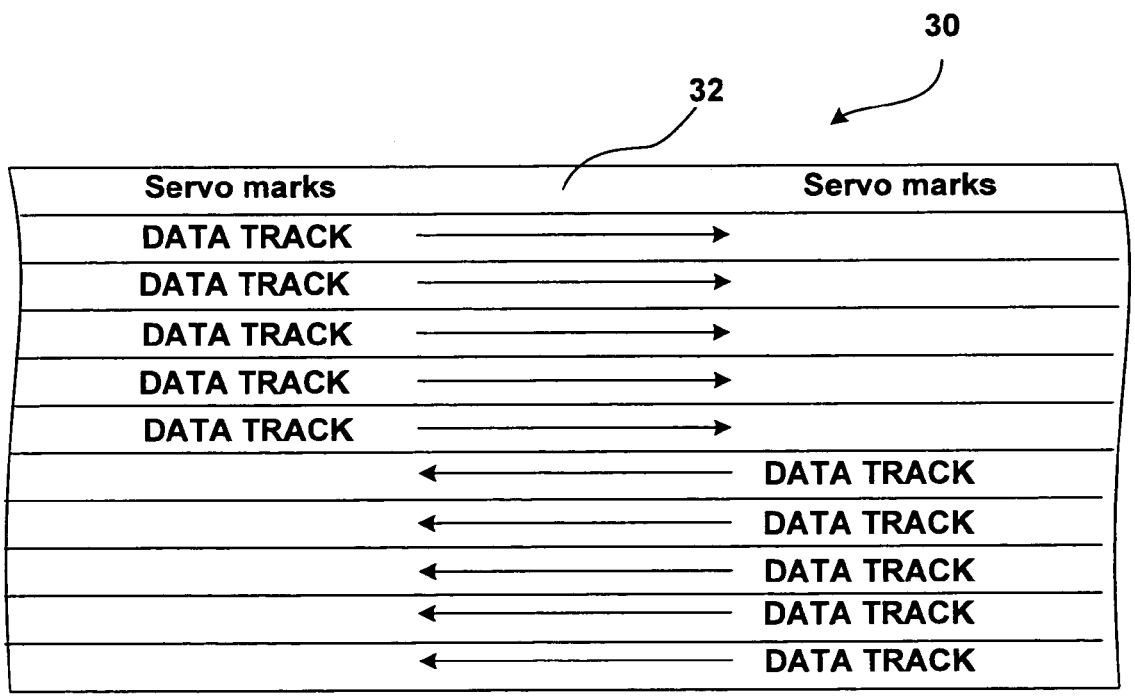

FIGS. 2 and 3 are conceptual views of portions of linear data storage media 20 and 30 having a plurality of data tracks recorded at different densities in the forward and reverse directions. In data storage medium 20, the forward and reverse data tracks are arranged in an alternating manner across the width of medium 20. The forward and reverse data tracks are distinguished in FIG. 2 by the arrows indicating the recording direction associated with the respective data tracks. In FIG. 3, the forward data tracks are grouped together near the bottom of the medium 30 and the reverse data tracks are grouped together near the top of medium 30. A wide variety of other data track arrangements could also be used.

In any case, as shown in FIGS. 2 and 3, media 20 and 30 each include a plurality of first data tracks extending along the length of the medium, the first data tracks being recorded in the first direction, e.g., as illustrated by the arrows pointing right-to-left. In addition, each of media 20 and 30 includes a plurality of second data tracks extending along the length of the medium, e.g., as illustrated by the arrows pointing left-to-right. Thus, the first and second data tracks recorded in opposite directions. Moreover, in accordance with the first and second data tracks are recorded at different densities. Again, this can exploit directional dependence for certain media types and allows similar error rates to be achieved.

As further shown in FIGS. 2 and 3, media 20 and 30 each include servo marks 22, 32. Servo marks 22, 32 can improve the ability to locate the data tracks, particularly as the data tracks become narrower and more crowded on the surface of the data storage tape. Servo marks 22, 32 may be recorded in special servo tracks, as illustrated in FIGS. 2 and 3, or may be interspersed in the data tracks in other embodiments. In general, servo marks 22, 32 facilitate tracking of the data tracks on media 20, 30.

Figure 4:
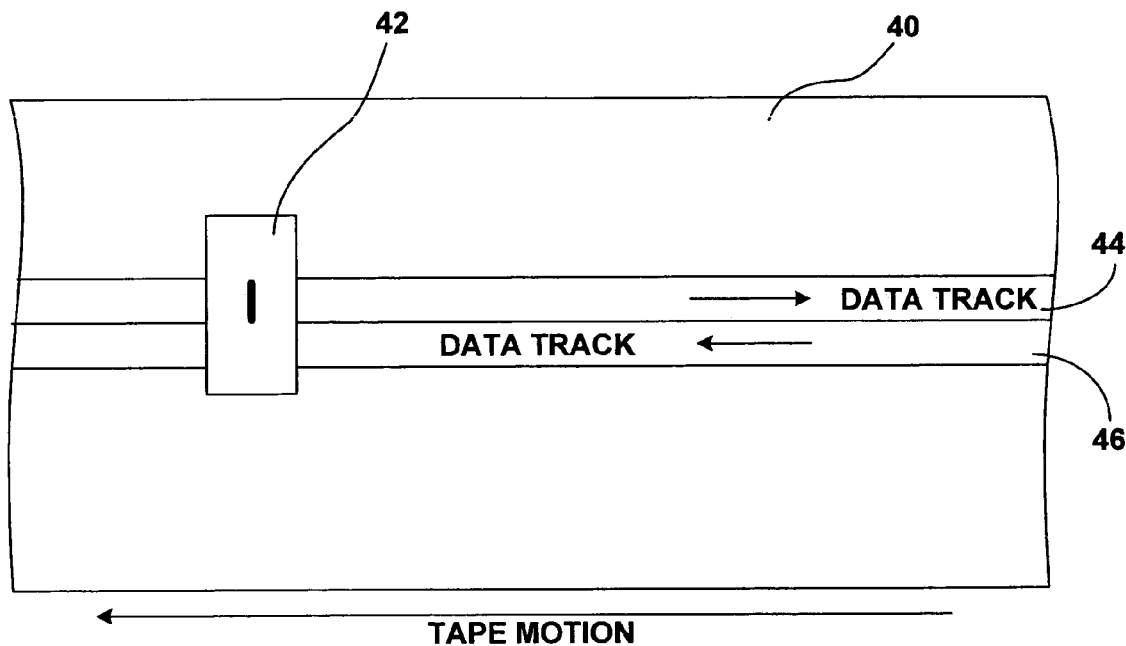
FIGS. 4 and 5 are conceptual views of magnetic heads passing over portions of linear data storage medium according to an embodiment of the invention.
Figure 5:
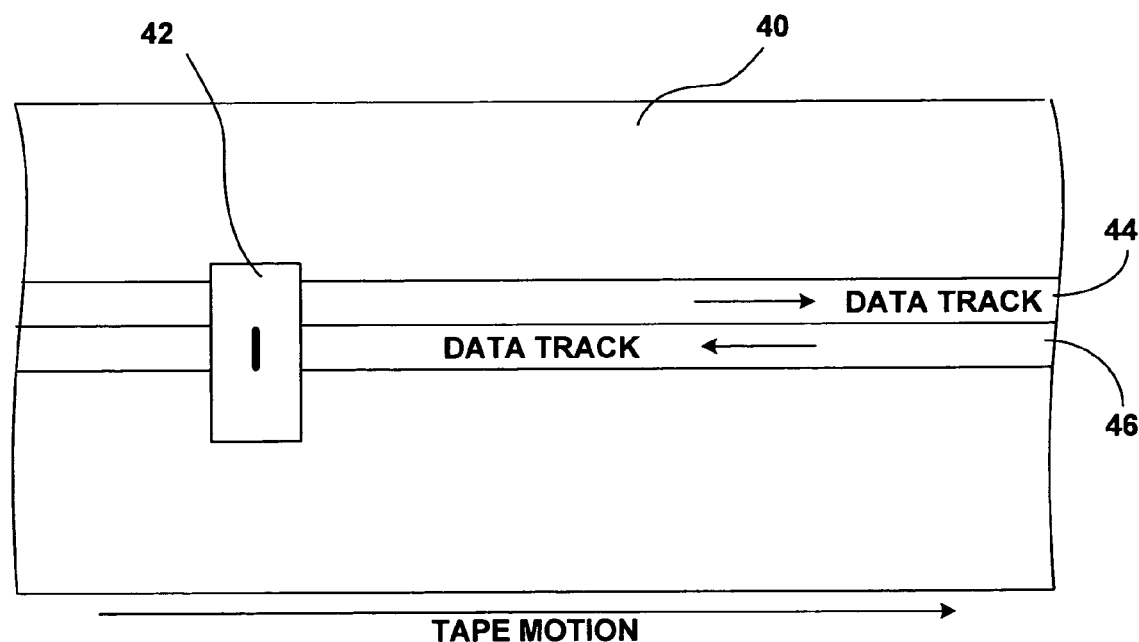

FIGS. 4 and 5 are conceptual views of a magnetic head 42 passing over a portion of linear data storage medium 40 according to an embodiment of the invention. In FIG. 4, head 42 is positioned over first data track 44 as medium 40 moves right-to-left relative to head 42. In FIG. 5, head 42 is positioned over second data track 46 as medium 40 moves left-to-right relative to head 42.

At least two different recording techniques may be used to record data in data tracks 44 and 46 at different densities. In one case, the first data on first data track 44 is written by head 42 at a first rate when medium 40 travels in the first direction relative to head 42 at a constant tape speed. The second data on second data track 46 is then written at a second rate when medium 40 travels in the second direction relative to head 42 at a similar or identical tape speed. The first rate may be different from the second rate. Accordingly, the recording rate of head 42 changes in the forward and reverse directions, at constant tape speed in the different directions, in order to vary the recording density in the forward and reverse directions.

In another case, the first data on first data track 44 is written by head 42 at a constant rate when medium 40 travels in the first direction relative to head 42 at a first speed. In this case, the second data on second data track 46 is written at the same rate when the medium travels in the second direction relative to the recording head at a second speed. The first tape speed, in this case, is different from the second tape speed. Accordingly, the tape speed may be changed in the forward and reverse directions, at constant recording rates in the different directions, in order to vary the recording density in the forward and reverse directions.

As mentioned above, a combination of these techniques in which the speed and the recording rate are varied in the forward and reverse directions can also be used. In that case, the desired recording densities in the forward and reverse directions can be defined differently in the forward and reverse directions by adjusting tape speed of tape 40 and recording rate of head 42 in the different directions.

Figure 6:
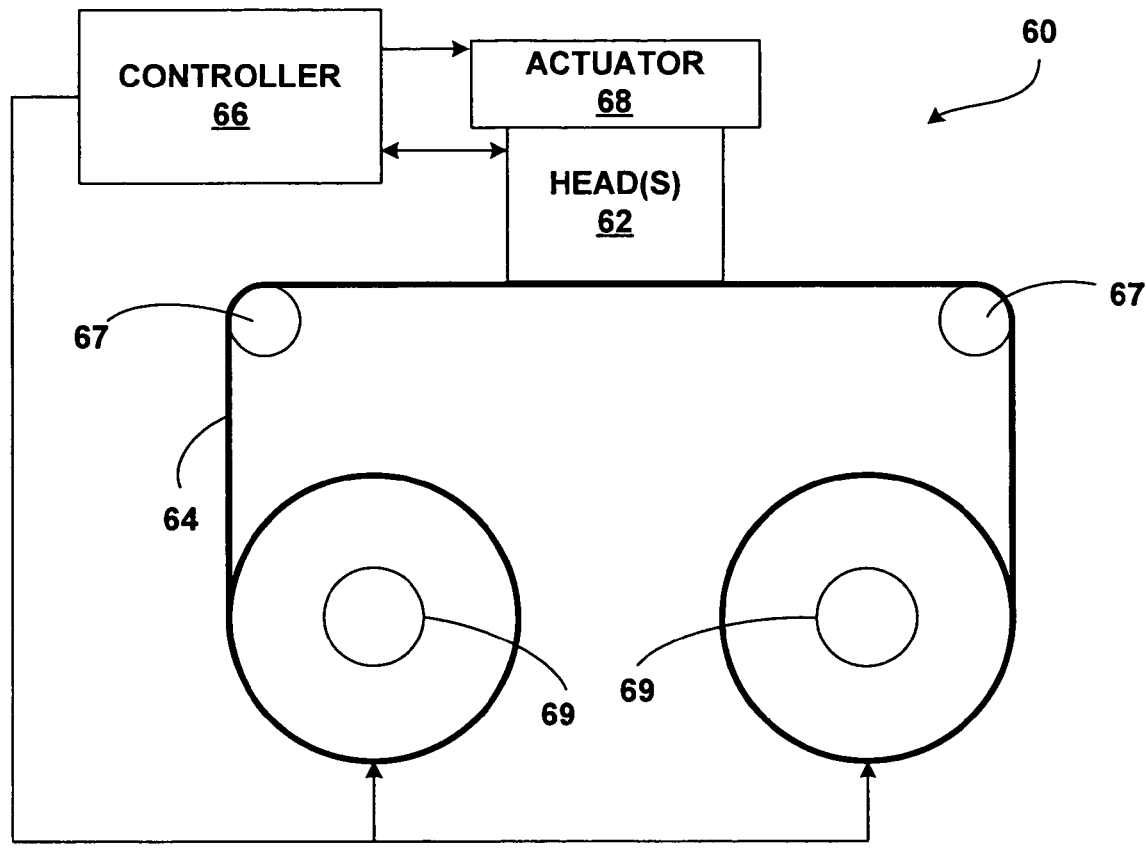
FIG. 6 is a block diagram of a system according to an embodiment of the invention.

FIG. 6 is a block diagram of a system 60 according to an embodiment of the invention. System 60 includes one or more recording heads 62 positioned to write data onto a linear data storage medium 64. As described herein, data storage medium 64 comprises a first data track extending along a length of the medium and a second data track extending along the length of the medium. The one or more recording heads 62 record first data in a first direction at a first density in the first data track and record second data in a second direction opposite the first direction at a second density in the second data track.

A controller 66 causes the recording heads 62 to record data at a first rate in the first direction and a second rate in the second direction. Controller 66 may send control signals to actuator 68 to control the cross-tape positioning of heads 62 relative to linear data storage medium 64. At a constant tape speed, controller 66 can adjust the recording rates of heads 62 in order to cause the recording heads 62 to record information at different densities in forward and reverse data tracks of medium 64. A servo head and servo actuator (not shown) may also be used to provide position error signals to controller 66, which may then be used to improve head positioning with respect to medium 64.

System 60 also includes a transport mechanism to move linear data storage medium 64 relative to heads 62. In this example, the transport mechanism includes a set of guides 67 and spools 69. Spools 69 may receive commands from controller 66 to cause linear data storage medium 64 to move at a first speed in the first direction relative to heads 62 and to move at a second speed in the second direction relative to heads 62. Spools holding the magnetic tape may be mounted on the rollers 69, or alternatively rollers 69 may rotate within a tape cartridge. The first speed may be different from the second speed. In that case, at a constant recording rate, the density of data stored on the tape would be different in the first and second directions.

Figure 7:
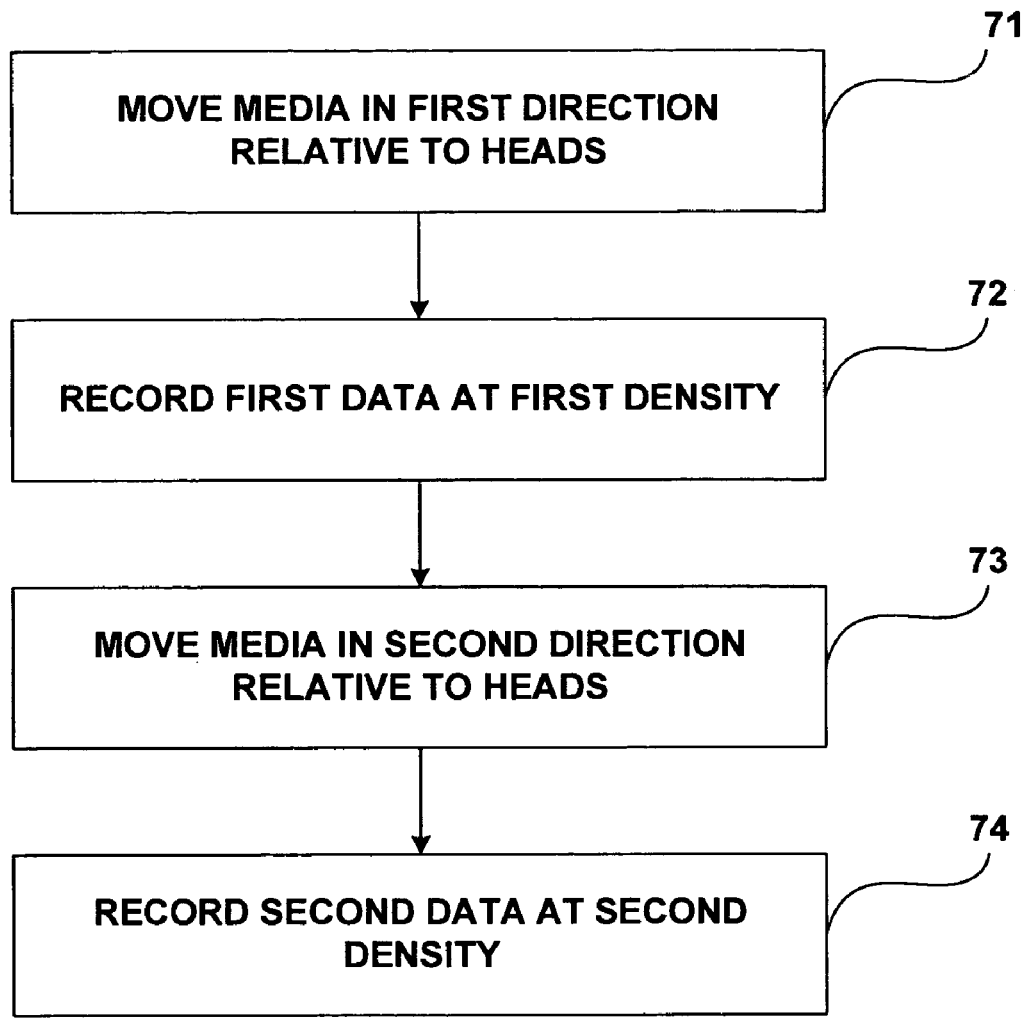
FIGS. 7–9 are flow diagrams illustrating techniques according to embodiments of the invention.
Figure 8:
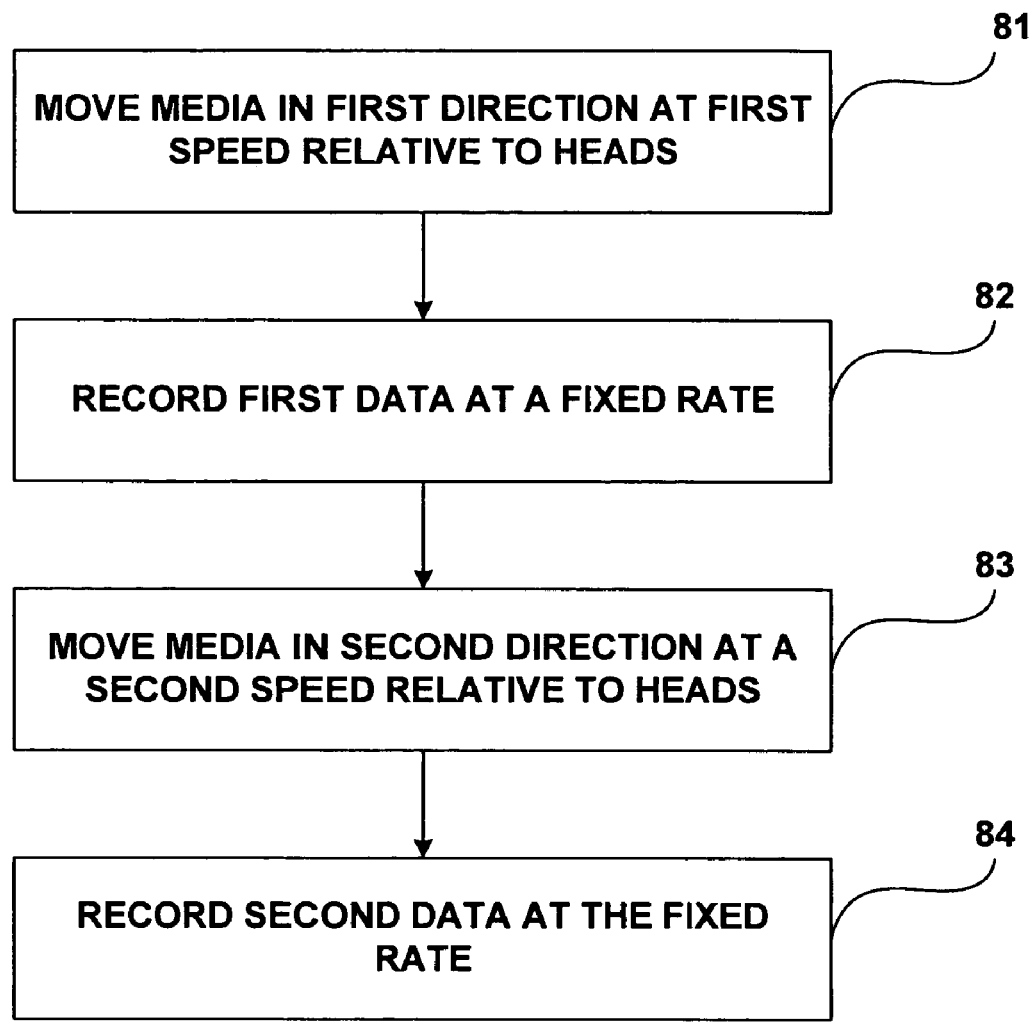
Figure 9:
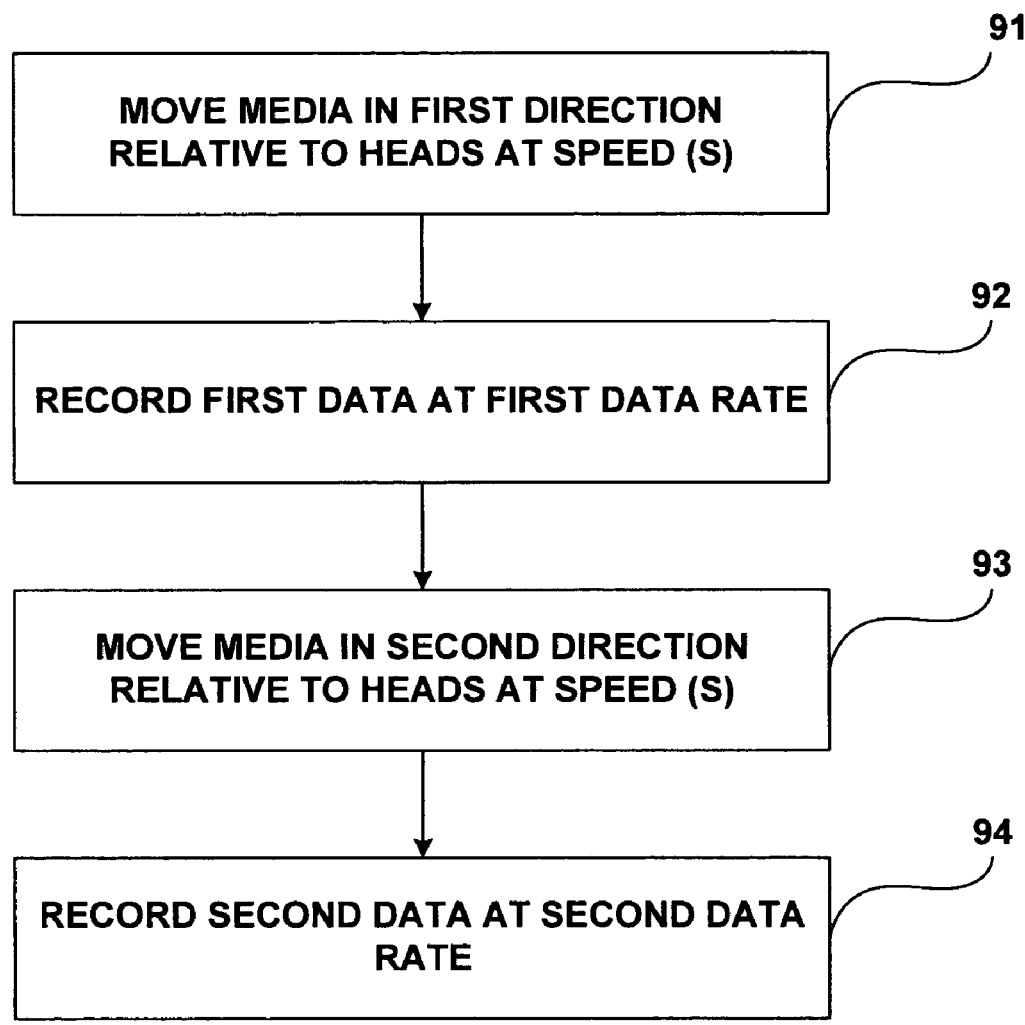

FIGS. 7–9 are flow diagrams illustrating techniques according to embodiments of the invention. FIGS. 7–9 will be described with reference to system 60 of FIG. 6. As shown, in FIG. 7, controller 66 causes rollers 69 to move medium 64 in a first direction relative to heads 62 (71). With tape motion in the first direction, controller 66 causes heads 62 to record first data at a first density (72). Controller 66 then causes rollers 69 to reverse the tape motion, i.e., to move medium 64 in a second direction relative to heads 62 (73). With tape motion in the second direction, controller 66 causes heads 62 to record second data at a second density (74). Importantly, the second density is different from the first, and may be selected such that the error rates in the first and second tape directions are substantially equal. By way of example, the first density may be at least 20 percent greater than the second density, and more typically 40 to 60 percent greater than the second density. In that case, the first density may be the density associated with the forward direction of ME tape and the second density may be the reverse direction associated with ME tape.

FIG. 8 illustrates a more specific technique in which tape speed is used to adjust the recording densities in the forward and reverse tape directions. As shown, in FIG. 8, controller 66 causes rollers 69 to move medium 64 in a first direction at a first tape speed relative to heads 62 (81). With tape motion in the first direction at the first tape speed, controller 66 causes heads 62 to record first data at a fixed rate (82). Controller 66 then causes rollers 69 to reverse the tape motion and change tape speed, i.e., to move medium 64 in a second direction at a second speed relative to heads 62 (83). With tape motion in the second direction at the second speed, controller 66 causes heads 62 to record second data at the fixed rate (84). Because the same recording rate is used in forward and reverse directions but the tape speed is different, data stored during forward motion is stored at a different density than data stored during reverse tape motion. The tape speeds may be selected to provide a desirable difference in storage density in the forward and reverse directions, e.g., such that the error rates in the forward and reverse tape directions are substantially equal. Adjustment of tape speed at a fixed data rate for different recording directions may provide advantages for dual density linear data storage medium recording. By way of example, the first tape speed may be at least 20 percent less than the second tape speed, and more typically 40 to 60 percent less than the second tape speed. In that case, the first tape direction may be the forward direction of ME tape and the second tape direction may be the reverse direction associated with ME tape.

Changing the tape speed can allow the system to maintain a constant recording rate. This can keep the required computer performance constant, and hide the effects of direction reversal from the other computer processes. On the other hand, constant speed recording can allow for improvement of other physical recording parameters, e.g., head-to-tape contact, which is more easily optimized at one speed only.

FIG. 9 illustrates a technique in which the recording rate is used to adjust the recording densities in the forward and reverse tape directions. As shown, in FIG. 8, controller 66 causes rollers 69 to move medium 64 in a first direction at a constant speed relative to heads 62 (91). With tape motion in the first direction at the first tape speed, controller 66 causes heads 62 to record first data at a first data rate (92). Controller 66 then causes rollers 69 to reverse the tape motion and causes heads 64 to adjust the data rate. Thus, medium 64 is moved in a second direction relative to heads 62 (93), and heads 62 record second data at the second rate (94). Because the same tape speed is used in forward and reverse directions but the data recording rate is different, data stored during forward motion is stored at a different density than data stored during reverse tape motion. The data rates may be selected to provide a desirable difference in storage density in the forward and reverse directions, e.g., such that the error rates in the forward and reverse tape directions are substantially equal. Adjustment of recording rate at a fixed tape speed for different recording directions may provide advantages for dual density linear data storage medium recording.

By way of example, the first recording rate may be at least 20 percent greater than the second recording rate, and more typically 40 to 60 percent greater than the second recording rate. In that case, the first tape direction may be the forward direction of ME tape and the second tape direction may be the reverse direction associated with ME tape. As mentioned above, constant speed recording can allow for improvement of other physical recording parameters, e.g., head-to-tape contact, which is more easily optimized at one speed only.

A number of embodiments of the invention have been described. For example, a dual density linear data recording medium has been described in which the track storage density is different for forward and reverse directions. As described, the dual density linear data storage medium can be recorded by varying the tape speed in the forward and reverse directions of the medium, or by varying the recording rate in the forward and reverse directions of the medium. A combination of varying the recording rate and tape speed in the forward and reverse directions could also be used. In any case, linear data storage media, and specifically directional dependent linear data storage media such as ME magnetic tape can benefit from the teaching of this disclosure. These and other embodiments are within the scope of the following claims.

The invention claimed is:

1. A linear data storage medium comprising:
   a first data track extending along a length of the medium, the first data track being recorded in a first direction along the length of the medium with first data at a first density; and
   a second data track extending along the length of the medium, the second data track being recorded with second data in a second direction opposite the first direction at a second density, wherein the first density is different from the second density.

2. The medium of claim 1, wherein an error rate associated with the first data on the first data track is substantially equal to an error rate associated with the second data on the second data track.

3. The medium of claim 1, wherein the medium comprises magnetic tape having an easy axis of magnetic recording domains that does not lie in a plane of the tape but is canted vertically from the plane of the tape.

4. The medium of claim 3, wherein the magnetic tape comprises metal evaporated (ME) magnetic tape.

5. The medium of claim 1, wherein the first data on the first data track is written at a first rate when the medium travels in the first direction relative to a recording head at a tape speed and the second data on the second data track is written at a second rate when the medium travels in the second direction relative to the recording head at the tape speed.

6. The medium of claim 1, wherein the first data on the first data track is written at a rate when the medium travels in the first direction relative to a recording head at a first speed and the second data on the second data track is written at the rate when the medium travels in the second direction relative to the recording head at a second speed.

7. The medium of claim 1, further comprising:
   a plurality of first data tracks extending along the length of the medium, the first data tracks being recorded in the first direction at the first density; and
   a plurality of second data tracks extending along the length of the medium, the second data tracks being recorded in the second direction opposite the first direction at the second density.

8. The medium of claim 7, wherein error rates associated with the first data tracks is substantially equal to error rates associated with the second data tracks.

9. The medium of claim 1, further comprising a servo track including servo marks to facilitate tracking of the data tracks.

10. The medium of claim 1, wherein the first density is at least approximately 20 percent greater than the second density.

11. A method of recording data on a linear data storage medium comprising:
    recording first data in a first direction on a first data track of the medium at a first density; and
    recording second data in a second direction on a second data track of the medium at a second density, wherein the first direction is opposite the second direction.

12. The method of claim 11, further comprising recording in the first and second directions such that an error rate associated with the first data on the first data track is substantially equal to an error rate associated with the second data on the second data track.

13. The method of claim 11, wherein the medium comprises magnetic tape having an easy axis of magnetic recording domains that does not lie in a plane of the tape but is canted vertically from the plane of the tape.

14. The method of claim 13, wherein the magnetic tape comprises metal evaporated (ME) magnetic tape.

15. The method of claim 11, further comprising
    recording the first data in the first direction on the first data track of the medium at a first rate as the medium moves at a speed in the first direction relative to a recording head; and
    recording the second data in the second direction on the second data track of the medium at a second rate as the medium moves at the speed in the second direction relative to a recording head.

16. The method of claim 11, further comprising recording the first data in the first direction on the first data track of the medium at a rate as the medium moves at a first speed in the first direction relative to a recording head; and recording the second data in the second direction on the second data track of the medium at the rate as the medium moves at a second speed in the second direction relative to a recording head.

17. The method of claim 11, further comprising:

recording the first data in the first direction on a plurality of first data tracks of the medium at the first density; and recording the second data in the second direction on a plurality of second data tracks of the medium at the second density.

18. The method of claim 11, further comprising detecting servo marks to facilitate recording head positioning relative to the data tracks.

19. A system comprising:

one or more recording heads;

a linear data storage medium comprising a first data track extending along a length of the medium and a second data track extending along the length of the medium, wherein the one or more recording heads record first data in a first direction at a first density in the first data track and record second data in a second direction opposite the first direction at a second density in the second data track.

20. The system of claim 19, further comprising a transport mechanism to move the linear data storage medium relative to the one or more heads at a first speed in the first direction and a second speed in the second direction, wherein the first speed is different from the second speed.

21. The system of claim 19, further comprising a controller to cause the recording heads to record data at a first rate in the first direction and a second rate in the second direction.

* * * * *